Dec. 15, 1936.    G. H. J. BAULE    2,064,646
AUTOMATIC CHANGE SPEED TRANSMISSION GEARING
Filed July 19, 1933    4 Sheets-Sheet 3

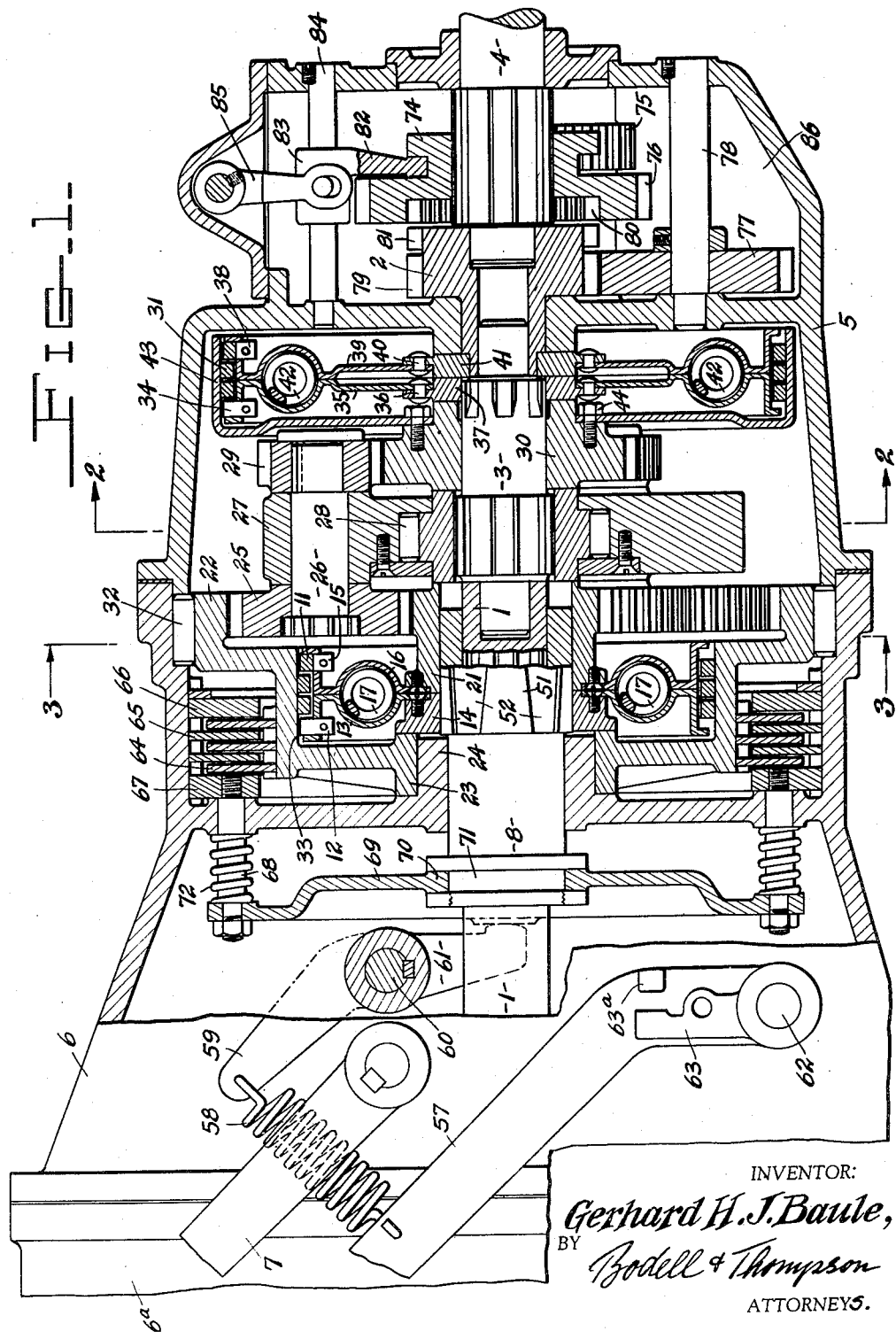

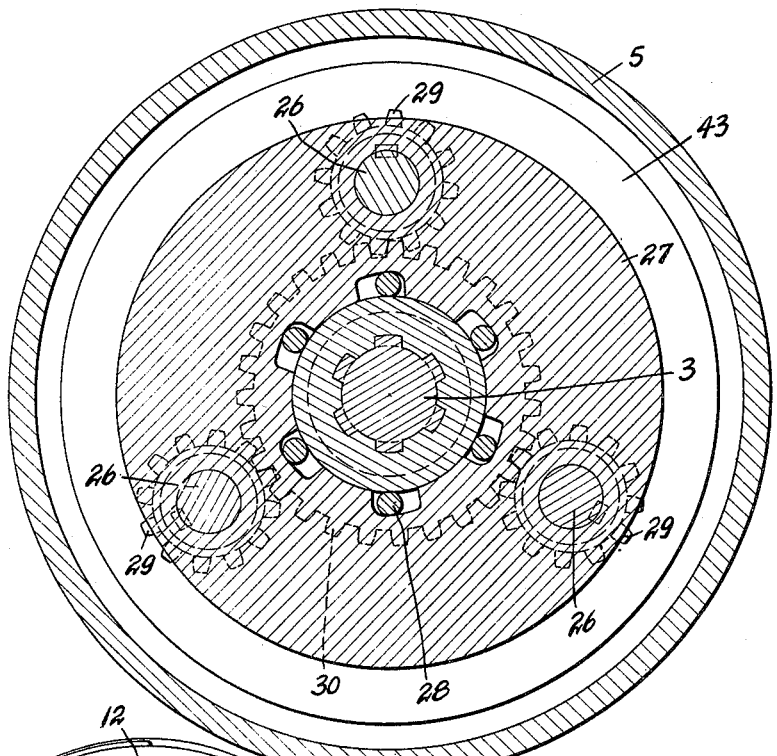
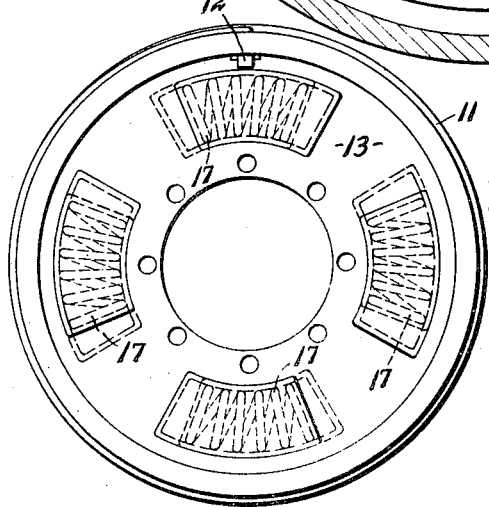

INVENTOR:
Gerhard H. J. Baule,
BY
Bodell & Thompson
ATTORNEYS.

Dec. 15, 1936. G. H. J. BAULE 2,064,646
AUTOMATIC CHANGE SPEED TRANSMISSION GEARING
Filed July 19, 1933 4 Sheets-Sheet 4
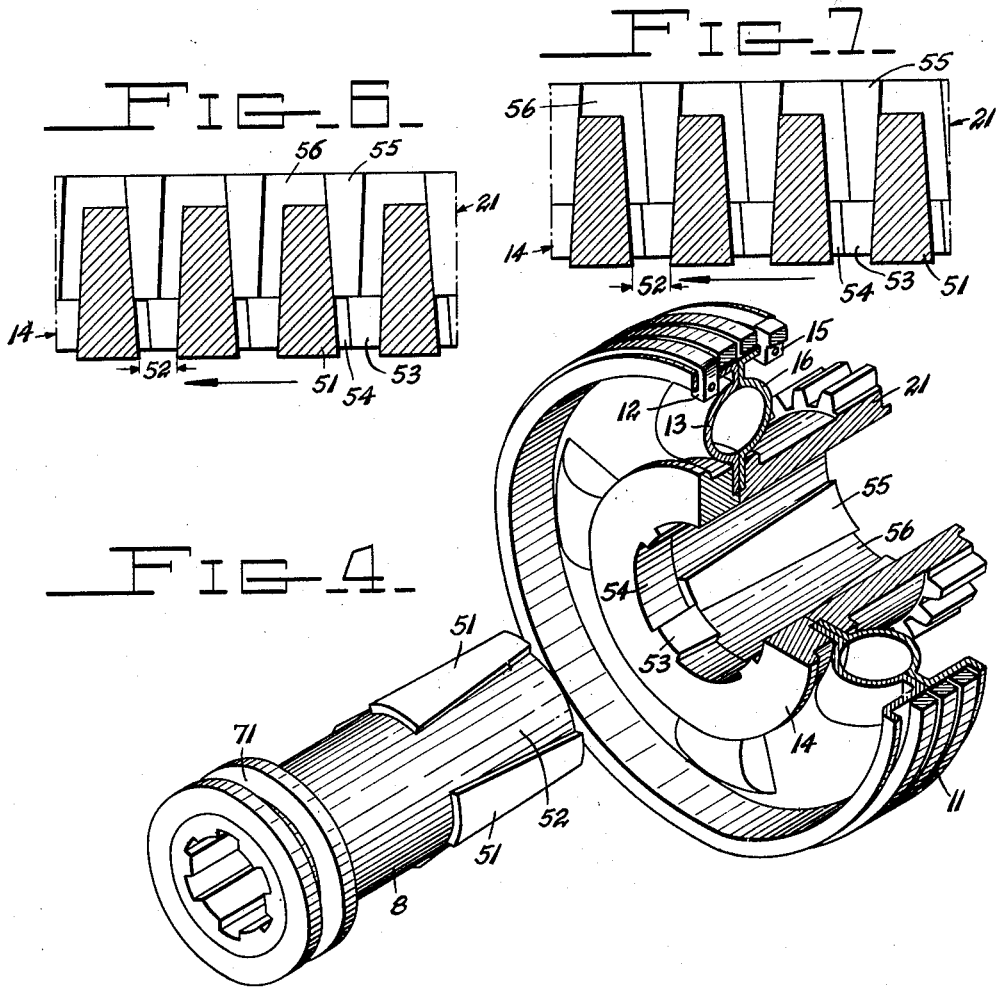
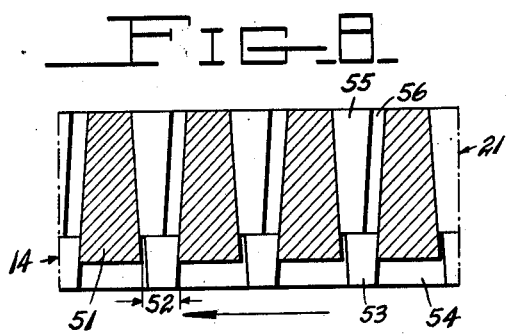
INVENTOR:
Gerhard H. J. Baule,
BY Bodell & Thompson
ATTORNEYS.

Patented Dec. 15, 1936

2,064,646

UNITED STATES PATENT OFFICE 2,064,646

AUTOMATIC CHANGE SPEED TRANSMISSION GEARING

Gerhard H. J. Baule, Syracuse, N. Y., assignor of one-half to Grace I. Haley, Syracuse, N. Y.

Application July 19, 1933, Serial No. 681,155

12 Claims. (Cl. 74—259)

This invention relates to change speed transmission gearing for use in motor vehicles for transferring the power of the motor or engine to the propeller shaft of the vehicle, and has for its object a transmission gearing in which the changes in speed, or so-called gear shifting, is effected automatically, and the automatic operation controlled by changes in the driving torque and the torque load on the driven element, or propeller shaft. That is, when the torque load increases as for instance, by reason of the vehicle encountering harder road conditions so as to unduly retard the engine causing it to labor, or tending to stall it, the gear change will be automatically made to a lower gear and if then through the lower gear the torque load is still too great for the motor, the shift will be automatically made into a still lower gear, and vice-versa when the load decreases as for instance by reason of the car gathering greater momentum, the shift will be automatically made from the lower to a higher, or to the highest, or direct drive gear. It will be understood that on the other hand changes may occur in the drive torque by reason of the operator changing the position of the throttle.

It further has for its object, an automatic change speed transmission gearing wherein the automatic gear changes are controlled by changes in torque between driving and driven elements, which embodies a slip clutch, or an automatically releasable and engageable or over-load clutch, and a normally idle reduction gearing which transmits the slipping or relative movement of the clutch and driving element to the driven element, when the clutch slips or is released on account of it being over-loaded, and also an automatic change speed gearing embodying a series of successively releasable clutches, each clutch controlling a train of reduction gears, and being stronger or requiring more torque load to cause release than the clutch preceding it in the series.

It further has for its object such a clutch in which the reduction, or change speed gearing, is a planetary gearing normally rotating as a unit with the driving and driven elements in direct drive relation and becoming effective to transmit the motion through the orbital movement of the planet gears, or a combined orbital movement of the planet gears and a rotative movement thereof about their own axes when the clutch slips or releases.

It further has for its object a particularly simple and economical mechanism operated by changes in torque for releasing and re-engaging the clutch which controls the operation of the reduction gearing.

It further has for its object an operator-operated mechanism for shifting at will from high gear to a lower gear in such situations as when the second gear is desired in running down a hill to use the engine as a brake, and also such an operator-operated mechanism which is automatically operated in conjunction with the brake pedal or other control lever or pedal of the vehicle.

It further has for its object, a particularly simple and efficient automatic slip, or releasable over-load clutch, and means controlled by a change in torque for releasing it, or causing it to slip or release which will not become heated, or unduly heated, by the slipping or the engaging and releasing operation.

It further has for its object, a particularly simple and compact arrangement of the planetary change speed gearing relative to the driving and driven elements, or shafts.

Other objects appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a longitudinal, vertical, sectional view of one embodiment of this gearing.

Figures 2 and 3 are sectional views taken respectively on lines 2—2 and 3—3, Figure 1.

Figure 4 is an isometric view, partly broken away or in section, of the operator-operated means for the slip or automatically releasable and engageable clutch.

Figure 5 is a detail view of the spring means for normally holding the clutch engaged, and operable by a change in torque to release the clutch.

Figures 6 and 7 are developed views illustrating the operation of the means operated by the torque for releasing one of the clutches.

Figure 8 is a view similar to Figures 6 and 7 showing the operation of the parts shown in Figures 6 and 7, when shifted by the brake pedal to obtain second gear.

Figure 3:
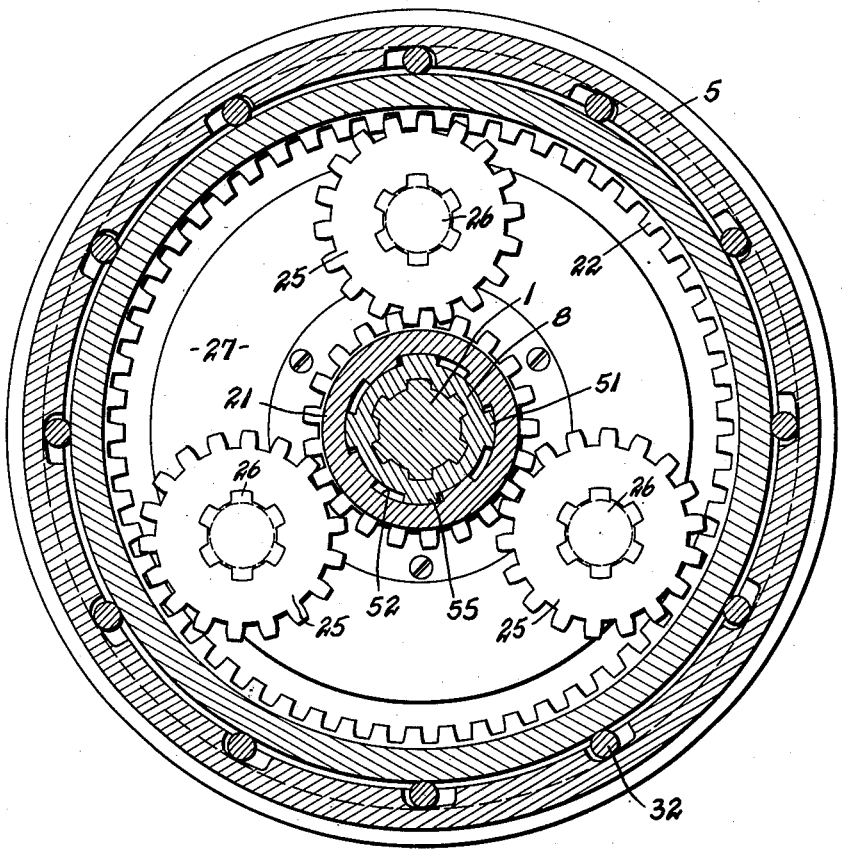
Figures 9, 10:
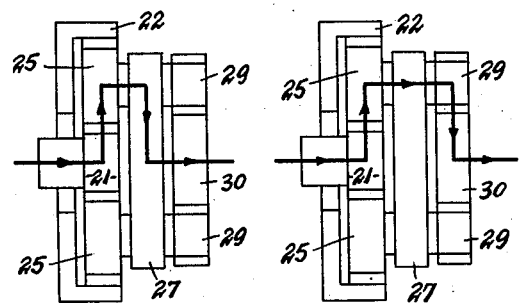
Figures 9 and 10 are diagrammatic views showing the gears through which the movement is transmitted when in first or low gear and in second or intermediate respectively.

This automatic change speed transmission gearing includes, generally, driving and driven elements, a normally engaged clutch for transmitting the rotation of the driving element to the driven element in direct drive relation, and operable to slip or release when the torque load on the driven element tends to become greater than the torque of the driving element, and both the driving torque and the torque load reach a predetermined minimum, and reduction gearing, preferably of the planetary type, for transferring the relative slipping movement, or the relative rotative movement of the clutch to the driven element.

I have here shown my invention as embodied in a three speed transmission gearing, that is, first or low, second or intermediate, and high speed, or direct drive, although it will be understood that any desired number of gear changes may be used. Also, I have shown one form of reverse.

1 designates the driving element which, in most instances, is a shaft connected through the usual clutch of a motor vehicle to the crank shaft of the engine. This clutch may be of the general non-automatic type disengageable against its spring by depressing the clutch pedal or of the automatic type which disengages at a certain R. P. M. of the engine shaft.

2 is the driven element.

3 is an intermediate element which, in this three speed transmission gearing, becomes the driving element for the driven element 2 when the gear is in low speed forward, or becomes the driven element or a unit therewith when the gearing is in second or intermediate speed.

4 is a tail shaft which is connected to the propeller shaft of the vehicle, the tail shaft having means to be hereinafter described for connecting it directly to the driven element 2, or for connecting it through idlers to the driven element 2 to produce reverse speed. The gearing is mounted in a suitable oil tight gear box or housing 5 which has the usual bell housing 6 at its front end for connection to the fly wheel housing 6ª of the engine and in which is located the main or engine clutch operated by the clutch pedal 7 all in the usual manner.

8 is a sleeve mounted on the drive shaft 1 and suitably keyed or splined thereto to rotate therewith. It is also shiftable axially for a purpose to be hereinafter explained. It is virtually part of the driving element 1, and its function is to provide operator-operated means to shift into second gear when desired.

11 designates the normally engaged clutch, it being normally engaged with a portion of the planetary gearing, to be presently described, and releasable when the torque load tends to become greater than the driving torque, and both the driving torque and the torque load reach a predetermined minimum.

The clutch here shown is an expansible and contractile coil secured at one end at 12 to one section 13 of a carrier, which section 13 is secured to a part, as a collar 14, rotatable with the shaft 1, or the sleeve 8, and secured at its other end at 15 to a section 16 which is secured to a part rotatable with and having a yieldingly resisted lost motion connection with, the driving element, or the sleeve 8. Resilient, expansible and contractile spring means are interposed between the two sections 13 and 16 to resist relative rotative movement thereof. The means here shown are coiled metal compression springs 17. The part to which the section 16 is secured is a sun gear 21 of the planetary gearing to be described.

The planetary gearing includes an annular internal gear 22 having a hub 23 suitably rotatably mounted in the housing or box 5 and here shown as mounted on a suitable bearing 24 in the casing and concentric with the shaft 1 or sleeve 8; the sun gear 21, previously referred to; a planet gear 25 meshing with the internal gear 22 and with the sun gear 21 and keyed to a spindle 26; a planet gear carrier 27 mounted concentric with the intermediate shaft 3 and in which the spindle 26 is rotatably mounted; a one-way, or over-running, or roller clutch 28 between the carrier 27 and the intermediate shaft 3; a planet gear 29 also keyed to the spindle 26 on the side of the carrier opposite to that on which the planet gear 25 is located; a sun gear 30 rotatably mounted on the element 3, in mesh with the planet gear 29; and a normally engaged slip or releasable clutch 31 operating generally in the same way as the clutch 11, and through which the sun gear 30 is clutched to the driven element 2 and the intermediate shaft 3.

The annular gear 22 is held from retrograde rotation in any suitable manner, here shown as by a roller clutch 32 interposed between its periphery and the housing 5. The annular gear 22 is also formed with a recess in which the clutch 11 and its companion parts are located, the clutch 11 being normally engaged with the peripheral wall 33 of the recess. The clutch 31 consists of an expansible and contractile coil secured at one end at 34 to a discoidal section 35 which is secured at 36 to a collar 37 keyed or splined to the intermediate shaft 3, and secured at its other end at 38 to a similar section 39 fixed at 40 to a collar 41 keyed or splined to the driven element 2. Resilient expansible and contractile spring means, as coil springs 42, are interposed between the two discoidal sections 35 and 39 to resist relative rotary movement thereof. The clutch or coil 31, when expanded, coacts against the inner face of a drum 43 having its head secured at 44 to the sun gear 30. The springs 42 are, in effect, stronger, or of greater weight, or mounted at greater radial distance than the springs 17, as the springs 42 control the low gear and hence, are subject to a greater torque or must resist a greater torque than the springs 17.

The connection between the sleeve 8 and the collar 14 and hub of the sun gear 21 will now be described. The sleeve is provided with tapered splines 51 which provide oppositely tapered spaces 52 between them. The collar 14 to which the discoidal section 13 of the clutch 11 is secured, is provided with internal splines 53 and spaces 54 between them, the splines 53 being of less width than the spaces 52 in which they are located. The hub of the sun gear 21 is provided with internal splines 55 providing spaces 56 between them, and the splines 55 are of less width than the spaces 52 in which they are located.

The springs 17 are so formed, or adjusted, that the pressure necessary to compress them is somewhat less than the maximum torque which may be produced by the motor. It will be understood that this pressure is applied to the springs 17, and likewise to the springs 42 of the clutch 31, by the action of the motor torque in one direction, and the action of the load torque in the opposite direction. Accordingly, the springs are arranged to yield when the motor torque and the load torque have both reached a predetermined value. Obviously, this value is somewhat less than the maximum torque of the motor. Otherwise, the motor would be stalled without effecting the shifting of the gearing into a lower ratio. It will be understood that the torque of the ordinary automobile motor is dependent upon several factors. For example, fuel consumption, speed, in R. P. M., and the relative load torque.

However, from the practical standpoint, it can be assumed that the springs 17 are compressed by the torque of the motor when the throttle is say three-quarters open, and the load torque has reached a value at least equal thereto. Obviously, the load torque must be equal to or be greater than the predetermined motor torque at which the springs are compressible.

For example, let us assume the load torque of the car, traveling on the level, is substantially equal to the motor torque normally produced with the throttle half way open. Under these circumstances, due to the fact that both the motor torque and the load torque have not reached the predetermined value of torque necessary to compress the springs 17, the clutch 11 will remain engaged and the motor will drive the car in direct drive, as hereinbefore explained. Assuming now that the car is traveling up sufficient grade to considerably raise the load torque, and the driver to maintain his speed having accordingly opened the throttle more than three-quarters, both the motor torque and the load torque now exceed the predetermined factor necessary to compress the springs 17, then the springs yield, disengaging the clutch 11. The torque of the motor is now transmitted through the reduction gearing, which, as here disclosed, consists of the planetary gearing, and through the clutch 31.

Now assume the grade becomes steeper. The load torque materially increases. The torque transmitted to the driving side of the clutch 31 is proportionately greater at a given throttle position than the torque of the motor itself, due to the fact that the motor torque is now being transmitted to the clutch 31 through action of the reduction gearing. Accordingly, the torque value necessary to compress the springs 42 can be selected somewhat greater than the torque value necessary to compress the springs 17. The springs 42, like the springs 17, are arranged to yield when the driving torque and the load torque reach a predetermined value, and the clutch 31 disengages resulting in the transmission of the motor torque through a further reduction in gearing by effecting full operation of the planetary gearing. When the load torque falls below the predetermined value necessary to compress the springs 42, the springs will expand, and the clutch 31 will become engaged effecting a change from full operation to partial operation of the planetary gearing, as hereinbefore explained, and as the load torque further decreases, the springs 17 expand engaging the clutch 11, and the motor torque is then transmitted in direct ratio to the drive shaft of the car.

In order to shift into second gear at the will of the operator, means is provided for shifting the collar 8 inwardly, thus causing the splines 51 thereof, because they are tapered, to act on the tapered sides of the splines 53, 55 of the collar 14 and sun gear 21, (see Figure 8), and thus turn the collar and gear in opposite directions relative to each other to compress the springs 17 and release the clutch 11. The splines 53 and 55 of the collar 14 and gear 21 respectively are of less width than the spaces between the splines 51 for the purpose of permitting this shifting movement.

In the illustrated embodiment of my invention, the collar 14 and gear 21 are preferably shifted by the initial movement of the brake pedal 57 and as here shown, the initial movement of the brake pedal is transmitted to the sleeve 8 to shift it inwardly through a yielding connection or spring 58, and a shifting lever 59 pivoted at 60 to the housing and having a fork 61 for shifting the sleeve 8. The brake pedal 57 is pivotally mounted on a stud or shaft 62 on the bell housing, and this shaft has an arm 63 thereon, which is connected to the brake operating mechanism in any suitable manner. A shoulder 63$^a$ on the brake pedal coacts with the arm 63 and is normally spaced apart therefrom for permitting a slight movement of the brake pedal 57 relative to the arm 63 before the brake operating arm 63 is actuated. The lost motion is for the purpose of permitting the sleeve 8 to be shifted, before the brakes are applied and permitting shifting of the sleeve 8 without applying the brakes. Obviously, upon depression of the brake pedal 57, the motion thereof will be first transferred through the spring 58 to the shifting lever 59 to shift the sleeve 8 and release the clutch 11 and during this movement, the lost motion between the shoulder 63$^a$ and the arm 63 will be taken up and then if the brake pedal is depressed further, the spring 58 will stretch while the arm 63 is being actuated. Thus, if the operator wishes to use second gear, as when going down hill or under any other conditions, he merely has to depress the brake pedal slightly to effect the release of the clutch 11 so that in this automatic gearing, the operator can utilize second gear, when desired.

It will be understood that when the car is travelling under its own momentum and the propeller shaft rotates faster than the engine shaft, the gearing is in direct drive connection, due to the fact that all load is taken off the springs 17, 42 and the clutches 11, 31 are expanded or unwound.

Preferably, a brake is provided operated by the shifting of the sleeve 8 by the brake pedal 57 for stopping the annular gear 22 when the clutch 11 is released by shifting the sleeve 8, this brake being primarily for the purpose of preventing a violent back action of the internal gear 22 against the gear box through the roller clutch 32 and for immediately stopping any forward drifting of the annular gear 22 so that upon the depression of the brake pedal 57, the full braking effect of the second gear immediately becomes effective and without violent back action against the gear box. The brake here shown is a friction disk brake consisting of a set of disks 64 rotatable with the annular gear and interleaved with a set of disks 65 interlocked with the gear box, an abutment ring 66 against which the disks thrust, a pressure ring 67 having studs 68 slidable through the front wall of the gear box, a pressure plate 69 acting on the outer ends of the studs and having a ring 70 located in a peripheral groove 71 on the sleeve 8, so that the sleeve 8 will take part in any axial movement of the pressure plate 69, and returning springs 72 surrounding the studs and interposed between the pressure plate 69 and the wall of the gear housing. The fork 61 thrusts against the plate 69 and thus, when the plate 69 is shifted inwardly or to the right (Figure 1) by the depression of the brake pedal 57, the disk brake will be operated through the pressure plate 69, studs 68 and pressure ring 67, and stop the forward rotation of the internal gear 22 when the clutch 11 is released, and also prevent violent retrograde movement of the internal gear 22 due to the reaction of the planetary gearing. At the same time, the plate 69 shifts the sleeve 8 inwardly or to the right (Figure 1).

In order that the engine may idle, when the vehicle is standing still and without throwing out the main clutch and also in order to obtain reverse gear, a manually shiftable element 74 is provided which is shifted out of neutral in one direction to connect the tail shaft 4 in direct drive relation to the driven element 2 and in the other direction into mesh with one of the gears of a reverse gear spool 75, the other gear of which meshes with a gear 77 on a shaft 78, the gear 77 meshing with a gear 79 on the driven element 2. The element 74 has a clutch face 80 for coacting with a complemental clutch face 81 on the driven element 2 and also has a gear 76. The element 74 is shifted by means of a suitable fork 82 having a sleeve 83 slidable on a guide rod 84, which sleeve is actuated in any suitable manner as by a rock arm 85 connected to any suitable operator-operated lever. This reverse gearing is carried in a compartment 86 at the rear end of the gear box.

In operation, with any given throttle position, suppose that the torque load on the driven element 2 or tail shaft 4 is less than the predetermined value necessary to compress the springs 17, and that the element 74 is clutched to the driven element 2, the springs 17 are then normal or uncompressed and the connection between the sleeve 8 and the collar 14 and hub of the sun gear 21 are shown substantially in Figure 6 and the clutch 11 is engaged, whereupon the whole gearing rotates, as a unit, in direct drive relation. The splines 55 need not, however, be engaged with the splines 51, as shown in Figure 6, but may be spaced therefrom, if the springs expand sufficiently to engage the clutch 11 before the splines 51, 55 engage. Now assume that the torque load becomes greater, then the springs 17 are compressed, due to the reaction of the driven element 2 through sun gear 30, planet gears 29, 25, sun gear 21 and splines 55 which come into the position shown in the developed view Figure 7, thus compressing the springs 17, causing the clutch 11 to contract, whereupon the annular gear tends to move in a retrograde direction or has no force carrying it forwardly and is held from retrograde movement by the roller clutch 32. However, as the springs 17 will compress gradually or not to full extent suddenly, the clutch 11 will release gradually or not suddenly, and will slip some. Hence, the annular gear, when the clutch 11 is releasing, will slow to a stop and will not stop suddenly. The whole gearing runs in oil with the usual provision for cooling the oil so that the clutch will not become heated. When the brake pedal 57 is touched or depressed, the clutch 11 is released suddenly but the disks 64, 65 of the brake, more or less, gradually retard the annular gear and avoid violent stopping thereof. The drive is then through the sun gear 21, planetary gear 25, planetary gear 29, sun gear 30, clutch drum 43, clutch 31, and the sections 35 and 39 through springs 42 to the driven element 2, as the clutch 31 is engaged. As the section 35 is splined to the intermediate element 3, this element will rotate with the sun gear 30 at a speed equal to the combined orbital and rotative movement of the planet gear 29, and will over-run the planet gear carrier 27 through over-running clutch 28. Now assume that the torque load further increases so that the reaction is sufficient to cause enough drag on the section 39 to compress the springs 42 so that the rear clutch 31 is disengaged, then the drive is through the sleeve 8, sun gear 21, planetary gear 25, planetary gear carrier 27, and the over-running clutch 28, intermediate element 3, clutch sections 35 and 39 through the compressed springs 42 and clutch coil 31 which is contracted or wound up on the peripheries of sections 36, 39 to the driven element 2. The sun gear 30 then merely idles since it is disconnected from the driven element 2 for the reason that the clutch 31 is disengaged from the drum 34 and is rotatably mounted on the intermediate element 3. It will be observed that the action of the clutch 31 is slightly different from that of clutch 11. In clutch 11, the discoidal member 13 is the driving part, and the internal gear 22 with the peripheral surface 33 is the driven part. If the clutch 11 becomes disengaged, when the torque of the drive and driven elements reaches a predetermined value and compresses the springs 17, and simultaneously contracts the clutch spring 11, the internal gear 22 will start to slip. When the internal gear slips, however, the load torque is taken off the sun gear 21, and clutch 11 will reengage. This disengaging and reengaging cycle of the clutch 11 is repeated until the internal gear has slipped to a standstill and is caught up by the roller clutch 32, thus providing a reactance for the planet gears 25.

In clutch 31, the drum 43, which is fastened to the sun gear 30, constitutes the driving part. The drive occurs from the drum 43, through the coils of clutch 31, to section 35, through springs 42, section 39 to the driven element 2. If the torque increases sufficiently the section 39 will drag and compress the springs 42, at the same time releasing coil after coil of clutch 31 from contact with drum 43 until clutch 31 slips. When clutch 31 slips, springs 42 and the clutch coils expand again, and this cycle is repeated until the planet gear carrier 27 catches up with the intermediate shaft 3 through roller clutch 28, whereafter the drive will be from intermediate shaft 3 through section 35, springs 42, section 39, to the driven element 2. The springs will now be held compressed by the higher torque transmitted by intermediate element 3, the clutch 31 will be released, and the sun gear 30 with the drum 43 will idle on intermediate shaft 3. It is obvious that during slippage both of clutch 11 and of clutch 31, either the motor may be kept at constant speed and the car slow down, or the car may be kept at constant speed and the motor be accelerated.

The reverse of this action takes place when starting from a standstill as first the torque load will be sufficient to release both clutches 11 and 31, and then as momentum is gained and the power increased by opening the throttle more, first the rear clutch 31 will engage, connecting the gearing into second speed and then finally the clutch 11 will engage, connecting the gearing into direct drive. To back up the vehicle, the element 74 is shifted to bring the gear 76 into mesh with the gear 75. To select a lower gear at any time it is merely necessary to depress the brake pedal 56 slightly to disengage the clutch 11.

What I claim is:

1. In an automatic change speed transmission gearing, the combination of driving and driven elements, and planetary change speed gearing between said elements including sun gears, one for the driving element and one for the driven, the sun gear for the driving element having a limited rotative movement relative thereto and spring means for resisting said movement, an internal gear, a planetary gear carrier, planet gears carried thereby, one meshing with one sun gear, and the annular gear, and the other meshing with the other sun gear, means for holding the annular gear from retrograde rotation, a normally engaged clutch between the driving element and the annular gear, and means operable by the relative movement of the sun gear connected to the driving element for releasing the clutch when the torque of the driving and driven element reaches a predetermined value, thereby effecting relative planetary movement of the planet gears for transmitting the movement of the drive element to the driven element through the planet gears.

2. In an automatic change speed transmission gearing, the combination of driving and driven elements, a normally engaged clutch for transmitting the rotation of the driving element to the driven element in direct drive relation, means to release the clutch, whereby the driving element rotates relatively to the driven when the clutch is released, normally idle reduction gearing between the driving and driven elements, said reduction gearing including a sun gear rotatable with the driving element and having a limited yieldingly resisted movement relative therewith effected by the driving and load torque reaching a predetermined value, means operated by the relative movement of the sun gear to release the clutch, a planet gear meshing with the sun gear, and revoluble therewith when the clutch is engaged and revoluble orbitally and rotatable about its own axis when the clutch is disengaged, a second planet gear rotatable with the former planet gear and connected to the driven element, and a planet gear carrier for transferring the orbital and rotatable movement of the planet gears to the driven element.

3. In an automatic change speed gearing, the combination of driving and driven elements, a normally engaged clutch for transmitting the rotation of the driving element to the driven element in direct drive relation and operable by torque to release the clutch whereby the driving element rotates relatively to the driven element, and reduction gearing for transferring the relative rotative movement of the driving element to the driven element when the clutch is released, said gearing including an annular gear having a clutch face with which the clutch normally engages, a sun gear rotatable with the driving element through a resisted lost motion connection, a planet gear meshing with the sun gear and the annular gear, means for preventing retrograde rotation of the annular gear, and means for transferring the orbital movement and the rotative movement of the planet gear to the driven element.

4. In an automatic change speed transmission gearing, the combination of driving, driven and intermediate elements, planetary gearing between said elements including an annular gear, a sun gear rotatable with the driving element, a planetary gear carrier mounted on the intermediate element and connected thereto by an over-running clutch device, a sun gear rotatably mounted relatively to the intermediate and the driven elements, planet gears mounted on the planet gear carrier, one meshing with the first sun gear and with the annular gear and the other with the second sun gear, a normally engaged releasable clutch coacting with the annular gear whereby the annular gear normally turns as a unit with the driving element, resilient expansible and contractile means operable when the torque between the first sun gear and the driving element reaches a predetermined value to release the clutch, a second normally engaged clutch normally clutching the second sun gear to the driven element, resilient expansible and contractile means for holding the second clutch engaged, and means operable when the torque between the driven element and the second sun gear reaches a predetermined value to release the second clutch, the resilient expansible and contractile means of the second clutch being of greater strength than that of the first clutch, and means for holding the annular gear from retrograde movement.

5. In an automatic change speed transmission gearing, the combination of driving, driven and intermediate elements, planetary gearing between said elements including an annular gear, a sun gear rotatable with the driving element, a planetary gear carrier mounted on the intermediate element and connected thereto by an over-running clutch device, a sun gear rotatably mounted relatively to the intermediate and the driven element, planet gears mounted on the planet gear carrier, one meshing with the first sun gear and with the annular gear and the other with the second sun gear, a normally engaged releasable clutch coacting with the annular gear whereby the annular gear normally turns as a unit with the driving element, resilient expansible and contractile means operable when the torque between the first sun gear and the driving element reaches a predetermined value to release the clutch, a second normally engaged clutch normally clutching the second sun gear to the driven element, resilient expansible and contractile means for holding the second clutch engaged, and means operable when the torque between the driven element and the second sun gear reaches a predetermined value to release the second clutch, the resilient expansible and contractile means of the second clutch being of greater strength than that of the first clutch, means for holding the annular gear from retrograde movement, and operator-operated means for releasing one of the clutches at the will of the operator.

6. In an automatic change speed transmission gearing, the combination of driving, driven and intermediate elements, planetary gearing between said elements including an annular gear, a sun gear rotatable with the driving element, a planetary gear carrier mounted on the intermediate element and connected thereto by an over-running clutch device, a sun gear rotatably mounted relatively to the intermediate and driven element, planet gears mounted on the planet gear carrier, one meshing with the first sun gear and with the annular gear and the other with the second sun gear, a normally engaged releasable clutch coacting with the annular gear whereby the annular gear normally turns as a unit with the driving element, resilient expansible and contractile means operable when the torque between the first sun gear and the driving element reaches a predetermined value to release the clutch, a second normally engaged clutch normally clutching the second sun gear to the driven element, resilient expansible and contractile means for holding the second clutch engaged, and means operable when the torque load on the driven element and the driving torque applied to the second sun gear reaches a predetermined value to release the second clutch, the resilient expansible and contractile means of the second clutch being of greater strength than that of the first clutch, means for holding the annular gear from retrograde movement, and operator-operated means for disengaging the first clutch at will.

7. In an automatic change speed transmission gearing, the combination of driving, driven and intermediate elements, planetary gearing between said elements including an annular gear, a sun gear rotatable with the driving element, a planetary gear carrier mounted on the intermediate element and connected thereto by an over-running clutch device, a sun gear rotatably mounted relatively to the intermediate and the driven element, planet gears mounted on the planet gear carrier, one meshing with the first sun gear and with the annular gear and the other with the second sun gear, a normally engaged releasable clutch coacting with the annular gear whereby the annular gear normally turns as a unit with the driving element, resilient expansible and contractile means operable when the torque load on the first sun gear and the driving torque reaches a predetermined value to release the clutch, a second normally engaged clutch normally clutching the second sun gear to the driven element, resilient expansible and contractile means for holding the second clutch engaged, and means operable when the torque load on the driven element and the driving torque applied to the second sun gear reaches a predetermined value to release the second clutch, the resilient expansible and contractile means of the second clutch being of greater strength than that of the first clutch, means for holding the annular gear from retrograde movement, and operator-operated means for disengaging the first clutch at will, and for applying a braking force to the annular gear.

8. In an automatic change speed transmission gearing, the combination of driving and driven elements, planetary gearing between said elements including a sun gear connected to the driving element and having a limited yieldingly resisted rotative movement relative thereto, an internal gear, a planet gear meshing with the sun gear and the internal gear and carried by the driven element, means for holding the internal gear from retrograde rotation, a normally engaged clutch between the driving element and the internal gear whereby the planetary gearing moves as a unit with the driving element, and means operable by the movement of the sun gear relative to the driving element for releasing the clutch and effecting connection between the driving and driven elements through said planetary gearing.

9. In an automatic change speed transmission gearing, the combination of driving and driven elements, planetary gearing between said elements including a sun gear connected to the driving element and having a limited yieldingly resisted rotative movement relative thereto, an internal gear, a planet gear meshing with the sun gear and the internal gear and carried by the driven element, means for holding the internal gear from retrograde rotation, a normally engaged clutch between the driving element and the internal gear whereby the planetary gearing moves as a unit with the driving element, and means operable by the movement of the sun gear relative to the driving element for releasing the clutch and effecting connection between the driving and driven elements through said planetary gearing, and operator-operated means for disengaging the clutch at the will of the operator.

10. In an automatic change speed transmission gearing, the combination of driving and driven elements, planetary gearing between said elements including a sun gear connected to the driving element and having a limited yieldingly resisted rotative movement relative thereto, an internal gear, a planet gear meshing with the sun gear and the internal gear and carried by the driven element, means for holding the internal gear from retrograde rotation, a normally engaged clutch between the driving element and the internal gear whereby the planetary gearing moves as a unit with the driving element, and means operable by the movement of the sun gear relative to the driving element for releasing the clutch and effecting connection between the driving and driven elements through said planetary gearing, and operator-operated means for disengaging the clutch at the will of the operator, and for applying a braking force to the internal gear.

11. In an automatic change speed transmission, the combination of driving and driven elements, change speed gearing arranged between the elements and including a normally engaged clutch, said clutch having a pair of sections yieldably rotatable relatively to each other, one of said sections being secured to the driving element, and the second section being secured to the driven element through the change speed gearing, said clutch also including a third section normally clutched to the first and second sections, and rotating therewith, said third section being operable when clutched to the first and second sections to prevent operation of the change speed gearing as such, and when declutched operable to permit operation of the change speed gearing as such, and means operable to move the first and second sections relatively to declutch the third section when the torque transmitted through the transmission reaches a predetermined value.

12. In an automatic change speed transmission, the combination of a pair of driving elements, driving means operable to rotate said driving elements at different speeds, and said driving means being connected to the low speed driving element through an over-running clutch, a driven element, a normally engaged clutch having first, second and third sections, the said first section being secured to the low speed driving element, and the second section being secured to the driven element, said third section being secured to the high speed driving element, said first and second sections being normally clutched to said third section to establish a drive connection between said high speed driving element and the driven element, and said first and second sections being operable, when the torque transmitted through the second and third sections reaches a predetermined value, to declutch from said third section and permit a drive from said low speed driving element to the driven element through the first and second clutch sections.

GERHARD H. J. BAULE.